United States Patent
Lang (10) Patent No.: US 6,385,810 B1
(45) Date of Patent: May 14, 2002

(54) LATCH ARRANGEMENT FOR A VACUUM CLEANER DIRT RECEPTACLE

(75) Inventor: Charles A. Lang, Hartville, OH (US)

(73) Assignee: The Hoover Company, North Canton, OH (US)

(*) Notice: Subject to any disclaimer, the term of this patent is extended or adjusted under 35 U.S.C. 154(b) by 0 days.

(21) Appl. No.: 09/565,797

(22) Filed: May 5, 2000

(51) Int. Cl.⁷ .................................................. A47L 9/10
(52) U.S. Cl. ........................................ 15/352; 15/353
(58) Field of Search ........................ 15/350, 351, 352, 15/353

(56) References Cited

U.S. PATENT DOCUMENTS

| | | | |
|---|---|---|---|
| 1,768,617 A | | 7/1930 | Lee |
| 1,900,692 A | | 3/1933 | Clements |
| 1,957,566 A | | 5/1934 | White |
| 2,599,527 A | | 6/1952 | Badger |
| 3,365,743 A | | 1/1968 | Haggstrom |
| 4,405,346 A | | 9/1983 | Tschudy et al. |
| 4,566,149 A | * | 1/1986 | Fitzwater ..................... 15/352 |
| 4,665,582 A | * | 5/1987 | Richmond et al. ............. 15/352 |
| 5,107,567 A | * | 4/1992 | Ferrari et al. .................. 15/350 |
| 5,129,125 A | * | 7/1992 | Gamou ......................... 15/352 |
| 5,659,922 A | * | 8/1997 | Louis ........................... 15/350 |
| 5,901,408 A | | 5/1999 | Miller et al. |
| 6,146,434 A | * | 11/2000 | Scalfani et al. ........... 15/353 X |

FOREIGN PATENT DOCUMENTS

| | | |
|---|---|---|
| GB | 2353837 A | 7/2001 |
| WO | 9930602 | 6/1999 |
| WO | 9930604 | 6/1999 |
| WO | 9930605 | 6/1999 |

OTHER PUBLICATIONS

Dyson Vacuum Cleaner Model DC03—Jun. 15, 1998—Photograph attached.
Hoover Vortex Vacuum Cleaner Model V2000–001—Apr. 21, 1999—Photograph and Owner's Manual (pp. 1 and 8) attached.
Regina Electrik Broom Vacuum Cleaner Model B–680–A—Nov. 5, 1968—Photographs and Owner's Brochure attached.
Regina Electrik Broom Vacuum Cleaner Model B–660–A—Oct. 13, 1968—Photographs and Owner's Brochure attached.
Hoover Stick Vacuum Cleaner Model S2155—Feb. 29, 1994—Photographs, Service Instruction pp. 266 and 267 and Service Bulletin attached.

* cited by examiner

Primary Examiner—Chris K. Moore
(74) Attorney, Agent, or Firm—A. Burgess Lowe; Michael J. Corrigan (57) ABSTRACT

A dirt cup latching mechanism that secures a lid onto a dirt receptacle of vacuum cleaner and simultaneously secures the dirt cup in place on the vacuum cleaner. The latching mechanism presses the lid down onto an open top of the dirt receptacle and presses the dirt receptacle down into a dirt cup retaining recess provided in a generally horizontal wall of the vacuum cleaner housing. The latching mechanism may press down on the top of an open topped dirt receptacle, with or without a lid, while simultaneously pulling the dirt cup horizontally against a generally vertical wall of the vacuum cleaner housing. Thus, the latching mechanism simultaneously presses the dirt receptacle down against one of an inlet and outlet seal located on the horizontal wall of the housing and horizontally against the other one of inlet and outlet seal on the vertical wall of the housing, thereby sealing both the receptacle inlet and outlet.

24 Claims, 8 Drawing Sheets

LATCH ARRANGEMENT FOR A VACUUM CLEANER DIRT RECEPTACLE

BACKGROUND OF THE INVENTION

1. Technical Field

The invention pertains to a latch arrangement for securing a dirt collecting receptacle in place on a vacuum cleaner.

2. Background Information

Upright vacuum cleaners are well known in the art. Typically, these upright vacuum cleaners include a vacuum cleaner housing pivotally mounted to a vacuum cleaner foot. The foot is formed with a nozzle opening and may include an agitator mounted therein for loosening dirt and debris from a floor surface. A motor may be mounted to either the foot or the housing for producing suction at the nozzle opening. The suction at the nozzle opening picks up the loosened dirt and debris and produces a stream of dirt-laden air which is ducted to the vacuum cleaner housing.

In conventional vacuum cleaners, the dirt laden air is ducted into a vacuum cleaner filter bag supported on or within the vacuum cleaner housing. However, bagless vacuum cleaners have recently become prevalent in the marketplace. These bagless vacuum cleaners duct the stream of dirt-laden air into a dirt receptacle or dirt cup having a dirt collecting system that filters the dirt particles from the air stream before exhausting the filtered air stream into the atmosphere. Various latching arrangements have been employed on these bagless vacuum cleaners to securely latch the dirt receptacle in place on the vacuum cleaner. Although these latch arrangements are adequate for the purpose for which they are intended, they are frequently cumbersome and difficult to use. There is a need in the art for a new and improved arrangement for securely latching a dirt collecting receptacle in place on a vacuum cleaner that is easy to use, securely retains the dirt cup in place on the cleaner, and effectively presses the receptacle against receptacle inlet and outlet seals on the cleaner's housing. There is also a need in the art for a vacuum cleaner dirt receptacle latching arrangement that securely retains a lid on an open top of the receptacle, as well as retaining the receptacle in place on the cleaner.

SUMMARY OF THE INVENTION

An objective of the present invention is to provide a new and improved latch mechanism that securely and removably latches a dirt receptacle in place on a vacuum cleaner.

A further objective is to provide a new and improved latch mechanism that securely and removably latches a dirt receptacle in place on a vacuum cleaner, while simultaneously securing a lid in place on the receptacle.

A still further objective is to provide a new and improved latching mechanism for latching a dirt cup in place on a bagless vacuum cleaner that is easy to operate.

Another objective is to provide a new and improved latching mechanism that latches a dirt receptacle in place on a vacuum cleaner, and presses the receptacle against receptacle inlet and outlet seals located on the vacuum cleaner.

Yet a further objective is to provide a latch mechanism that presses the receptacle simultaneously down on a first seal that seals against the bottom wall of the receptacle and horizontally against a second seal that seals against a sidewall of the receptacle.

These and other objectives will be readily apparent to one of skill in the art upon reviewing the following description and accompanying drawings.

These objectives are achieved by the present invention, which provides a dirt cup latching arrangement for a vacuum cleaner comprising a dirt cup housing having a recess formed in a front side thereof, said recess having a rear wall and at least one of a top and a bottom wall; a dirt cup for collecting dirt picked up by the vacuum cleaner, said dirt cup being sized to be removably placed in said recess; said dirt cup housing including a dirt cup latch for securely latching said dirt cup in place in said recess, said dirt cup latch including a latch member that is mounted to said housing on a side of said recess opposite from said at least one of a top and bottom wall; and wherein said latch member is mounted to move generally vertically relative to said housing into engagement with a top of said dirt cup to vertically retain said dirt cup between said at least one of a top and bottom wall and said latch member, and to move generally horizontally relative to said housing to horizontally retain said dirt cup between said rear wall and said latch member.

The present invention also provides a vacuum cleaner comprising a housing having a recess formed therein, said recess having a bottom wall; a dirt collecting cup having a lid, said cup being sized and shaped to be received in said housing and rest on said bottom wall; and a dirt cup latch mounted to said housing, said latch being movable from an unlatched position, in which said latch does not engage said cup or said lid, into a latched position, in which said latch engages said lid and press said lid sealingly in place on said cup and presses said cup, via said lid, against said bottom wall and thereby secure said cup in said recess.

BRIEF DESCRIPTION OF DRAWINGS

One form of the present will now be described by way of example with reference to the attached drawings, of which.

DESCRIPTION OF THE PREFERRED EMBODIMENT

Figure 1:
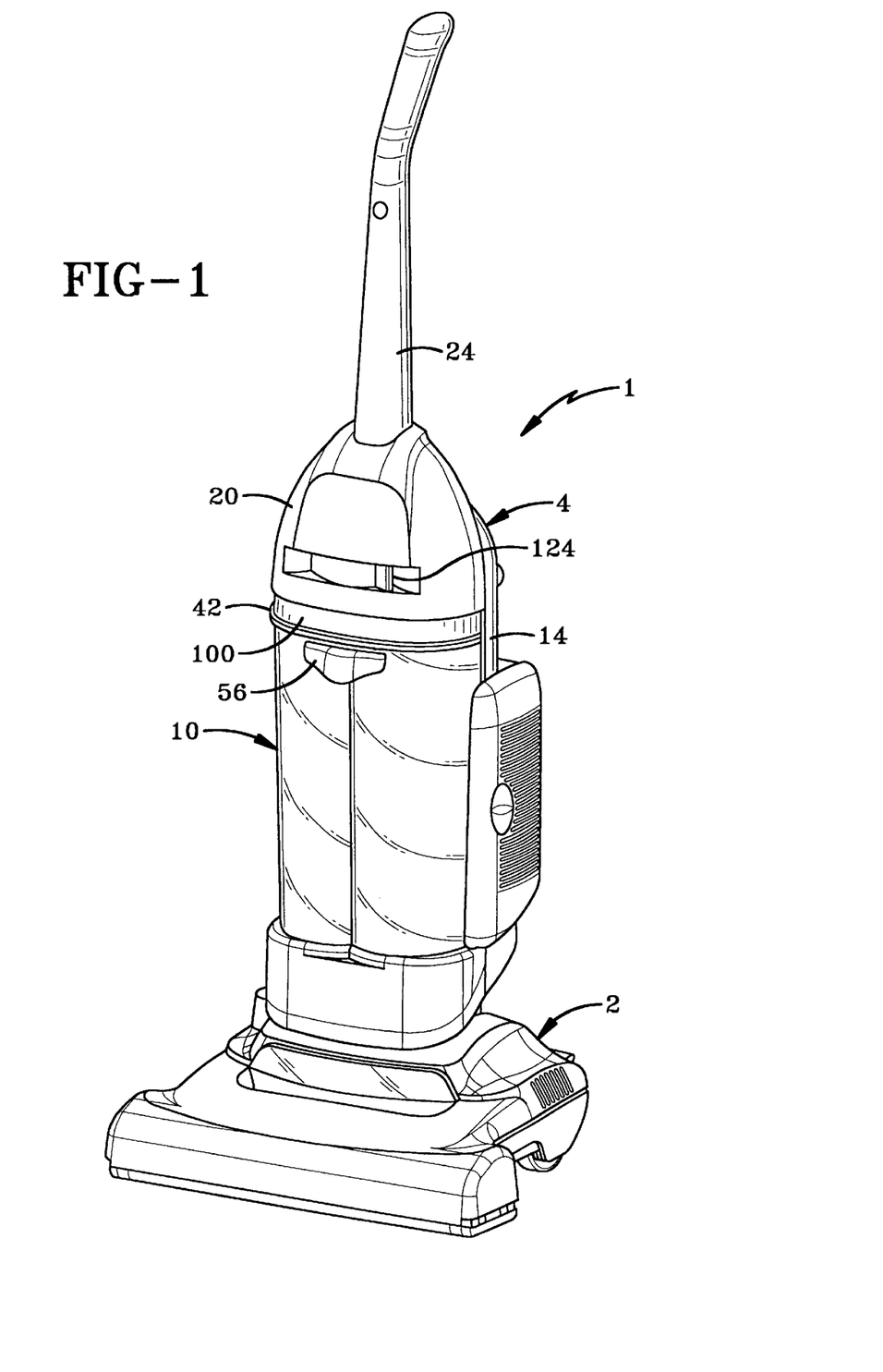
FIG. 1 is a perspective view of a vacuum cleaner incorporating a dirt receptacle latching arrangement according to one form of the present invention.

A vacuum cleaner incorporating a dirt receptacle or dirt cup latching arrangement according to one form of the present invention is shown in FIG. 1 and generally indicated as 1. Vacuum cleaner 1 includes a vacuum cleaner foot 2 and a vacuum cleaner housing 4 connected to the vacuum cleaner foot 2. The foot 2 is formed with a bottom suction nozzle inlet opening (not shown) which opens toward a floor surface. A conventional agitator (not shown) is positioned within an agitator chamber which communicates with the nozzle opening. The agitator rotates about a horizontal axis for loosening dirt from the floor surface.

Figure 2:
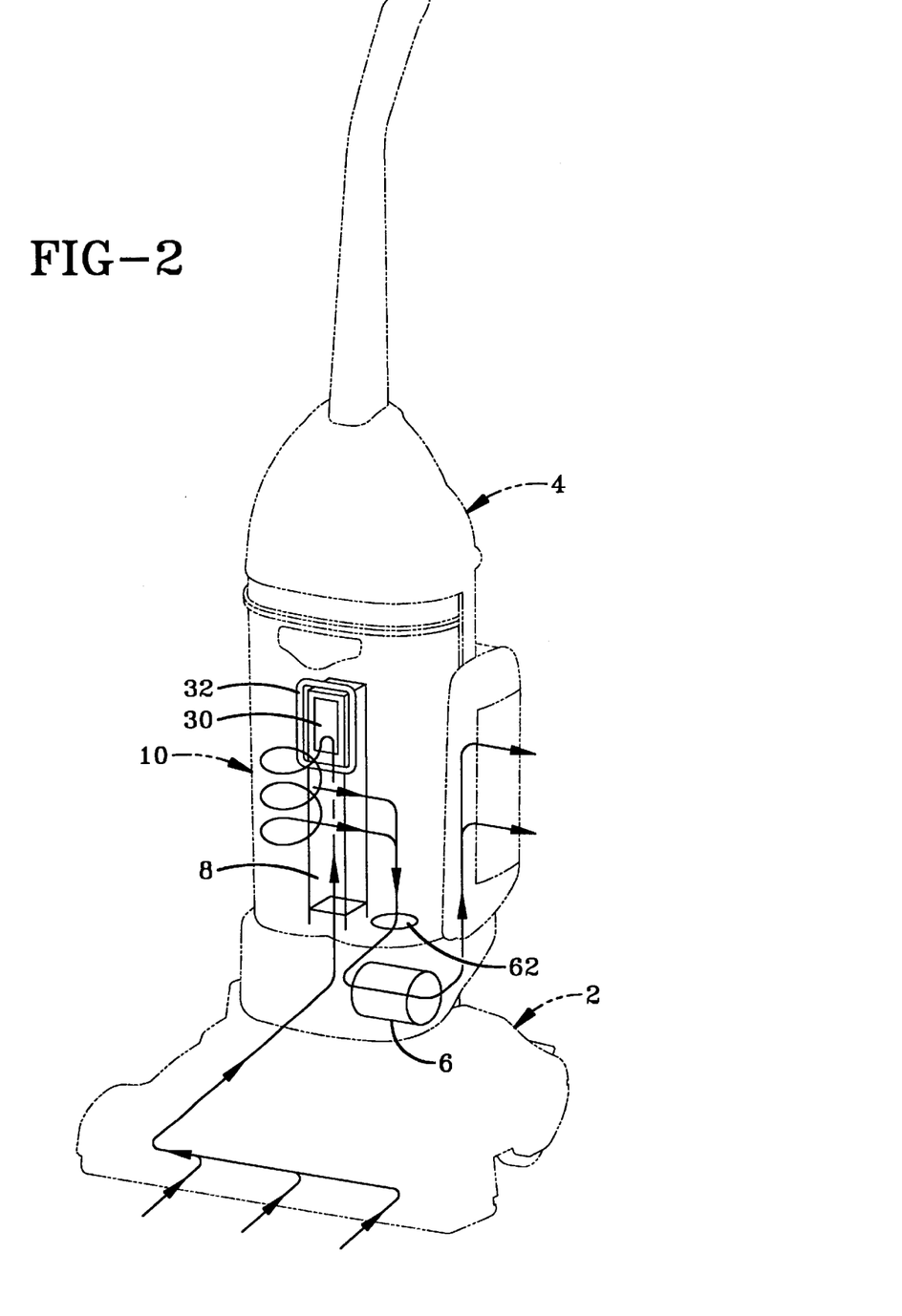
FIG. 2 is a diagrammatic view showing the vacuum cleaner of FIG. 1 illustrating the airflow through the vacuum cleaner.

With reference to FIG. 2, a motor-fan assembly 6 is positioned within the lower end of the housing 4 and is fluidly connected to the agitator chamber via a dirt duct in the foot(not shown), a dirt duct 8 on the housing 4, and a dirt cup 10. It will be appreciated that although the motor-fan assembly 6 is shown positioned within the housing 4, the motor-fan assembly may alternatively be positioned within the foot 2, without affecting the concept of the invention. The motor-fan assembly creates a suction in the dirt cup 10, which, in turn, creates a suction in the dirt duct 8 on the housing, the dirt duct in the foot 2, the agitator chamber and nozzle opening. The suction draws air and loosened dirt from the floor surface in through the nozzle opening and creates a stream of dirt-laden air which travels through the agitator chamber, the dirt ducts, the dirt cup (where the dirt is separated from the air and collected), the motor-fan assembly, and exhausted to atmosphere, as illustrated by arrows in FIG. 2.

Figure 3:
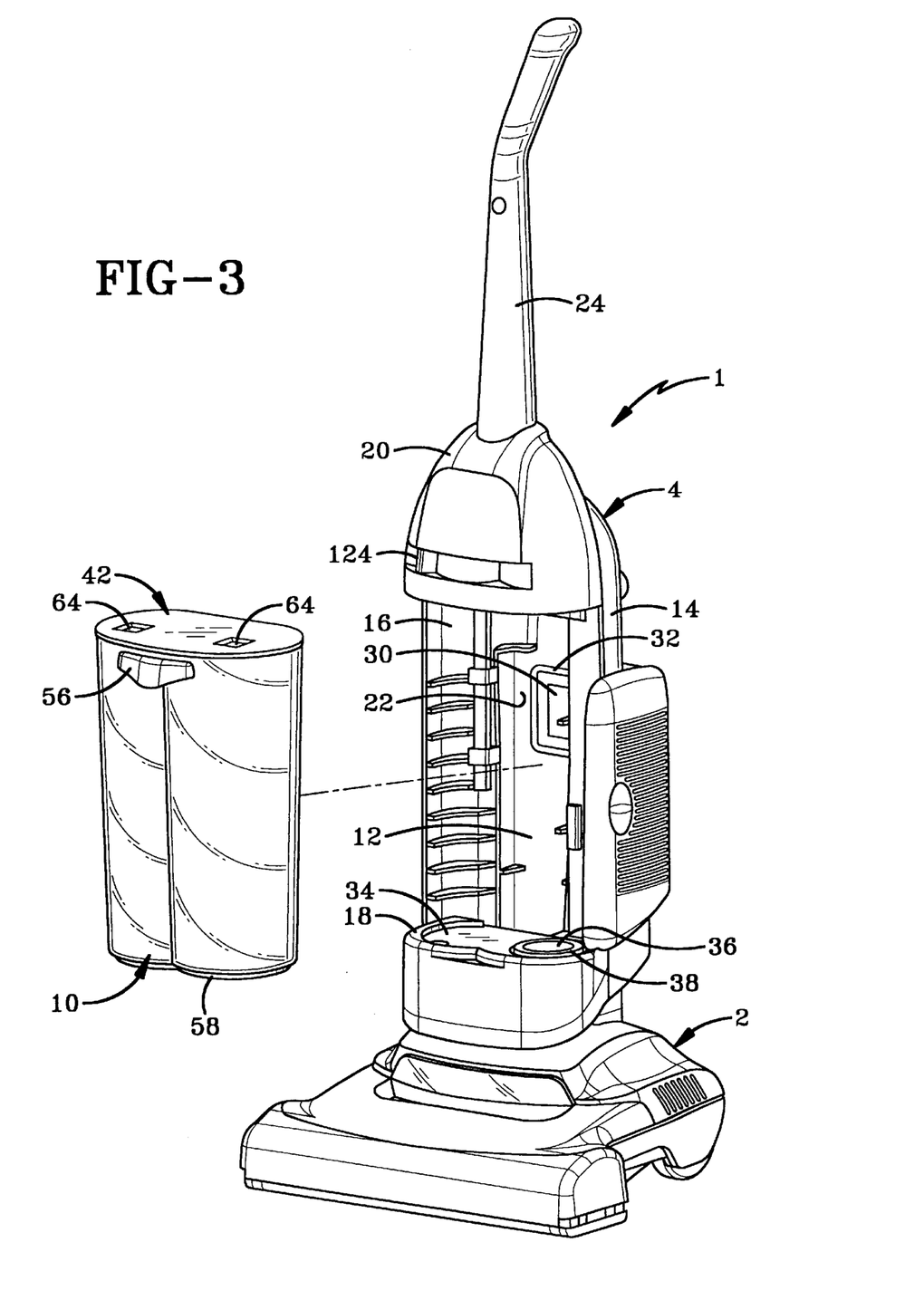
FIG. 3 is a perspective view of the vacuum cleaner of FIG. 1 showing the dirt receptacle removed from the cleaner.

Referring now to FIG. 3, the vacuum cleaner housing 4 is formed with a rear wall 12, a pair of side walls 14 and 16 extending forward from the rear wall, a bottom wall 18 and a top handle cover 20. The rear wall 12, side walls 14 and 16, bottom wall 18, and top handle cover 20 define a forward facing cavity 22 for receiving the dirt cup 10. The top handle cover tapers upwardly to an upper handle 24 of the vacuum cleaner 1 and houses the dirt cup latching mechanism, which will be described in detail below. A latch actuation lever 124 is located in a front central indented area of the top handle cover for selectively placing the latching mechanism in its latched and unlatched positions, as further discussed below.

The dirt duct 8 (FIG. 2) extends up the rear of the housing 4 and extends through an opening in the rear wall 12 of the housing into the cavity 22. The end of the dirt duct located in the cavity terminates in a dirt duct outlet opening 30. A dirt cup inlet seal 32, mounted to the rear wall 12, is positioned about the end of the dirt duct and forms an air tight seal with the dirt duct. The inlet seal also forms a face seal that seals against a rear wall of the dirt cup, as described in further detail below. The bottom wall 18 of the cavity 22 is formed with a recessed area 34 for receiving and supporting the dirt cup 10. A circular exhaust opening 36 is formed in the bottom wall 18. An outlet seal 38 mounted to the bottom wall extends about the exhaust opening and forms a face seal that seals against a bottom wall of the dirt cup. The exhaust opening 36 communicates with the inlet of the motor-fan assembly 6 (FIG. 2).

The dirt duct 8 may be integrally formed with the housing 4 or it may be a separate element that is attached to the housing, either within the cavity 22 or on the rear of the housing. When located on the rear of the housing, the dirt duct 8 may be partially or entirely formed of transparent material, whereby an operator may observe any blockage of the duct requiring removal. It is understood that although the dirt duct 8 is illustrated as being provided as part of the housing 4, the dirt duct may alternatively be formed integrally with the dirt cup 10, as disclosed in commonly owned U.S. patent application Ser. No. 09/519,106, filed on Mar. 6, 2000, the disclosure of which is hereby incorporated herein as of reference.

Figure 4:
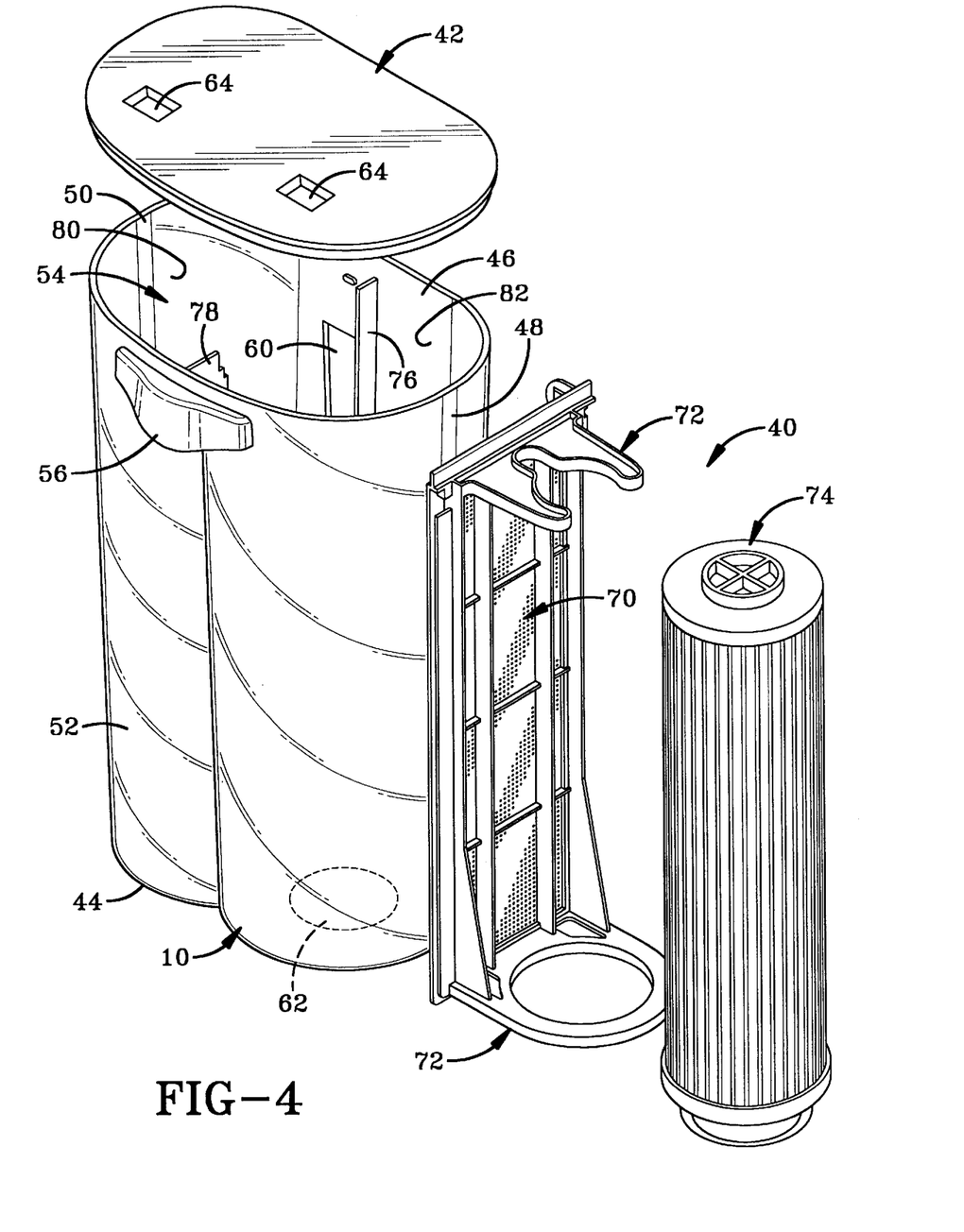
FIG. 4 is a perspective exploded view of the dirt receptacle according to one form of the present invention.

One form of a dirt cup assembly envisioned by the inventors is illustrated in FIG. 4. The dirt cup assembly includes the dirt cup 10, a filter assembly 40 removably mounted within the dirt cup, and a removable dirt cup lid 42 that encloses the open top of the dirt cup. The dirt cup includes a bottom wall 44, a generally flat rear wall 46, a pair of curved side walls 48 and 50, and a front wall 52. The rear wall, side walls and front wall extend upward from the bottom wall to form a dirt cup chamber 54. A handle 56 is provided in the center of the front wall near the top of the dirt cup, whereby a user may grasp the handle with one hand in order to remove the dirt cup assembly from or place the dirt cup assembly on the vacuum cleaner 1. The lower surface of the bottom wall of the dirt cup is formed with an inwardly stepped portion 58 (FIG. 3) which is matingly received within the recessed area 34 of the housing support of bottom wall 18. An inlet port 60 is formed in the rear wall 46 near the top of the dirt cup and an outlet port 62 is located in the bottom wall 44 of the dirt cup. In the present embodiment, the dirt cup is a one-piece member molded of substantially transparent ABS and may include an anti-static additive to prevent dirt from electro-statically adhering to the walls of the dirt cup. The lid is sealingly telescopically received on the open top of the dirt cup. A pair of recesses or pockets 64 are formed in the upper surface 60 of the lid for engagement by the latching mechanism, as described below.

One form of a filter assembly 40 envisioned by the inventors includes an apertured wall 70, a filter support 72 extending from the apertured wall, and a primary filter 74 removably mounted on the filter support. The filter assembly 40 is mounted in the dirt cup by suspending the filter assembly on flanges 76 and 78 integrally formed with the front 46 and rear 52 walls of the dirt cup. The apertured wall 70 separates the dirt cup chamber into a first dirt collecting chamber 80 and a second dirt collecting chamber 82. A plurality of apertures formed in the apertured wall provide fluid communication between the first dirt collecting chamber and the second dirt collecting chamber. The primary filter 74 is formed as a hollow cylindrical tube of pleated HEPA grade filter material that is closed at the top and sealingly communicates with the dirt cup outlet port 62 at the bottom.

The apertured wall 70 functions as a coarse particle separator or pre-filter that separates relatively large, coarse particles from the air stream. The coarse particles are collected in the first dust collecting chamber 80. The primary filter 74 functions as a fine particle separator that separates the fine particles from the air stream. The fine particles are collected in the second dust collecting chamber 82. The details of the dirt cup and filter assemblies do not form a part of the present invention and are therefore not describe herein in detail. A detailed description of the dirt cup and filter assemblies can be found in previously incorporated U.S. patent application Ser. No. 09/519,106 filed on Mar. 6, 2000. It will be appreciated that other bagless dirt cup assemblies may be employed with the present latch mechanism. For example, a cyclonic dirt with or without filter or without a lid may be employed The dirt cup assembly is placed on the cleaner by horizontally translating the dirt cup 10 into the cavity 22 (FIG. 2) in the housing 4 and lowering the cup, such that the inwardly stepped portion 58 of the dirt cup is received in the recessed area 34 of the bottom wall 18. When the dirt cup is placed in the cavity as described above, the rear wall 46 of the dirt cup 10 abuts up against the inlet seal 32, with the dirt duct outlet 30 in fluid communication with the dirt cup inlet opening 60. Similarly the bottom wall 44 of the dirt cup abuts up against outlet seal 38 (FIG. 3), with the exhaust opening 36 in fluid communication with the dirt cup outlet opening 62.

Figure 5:
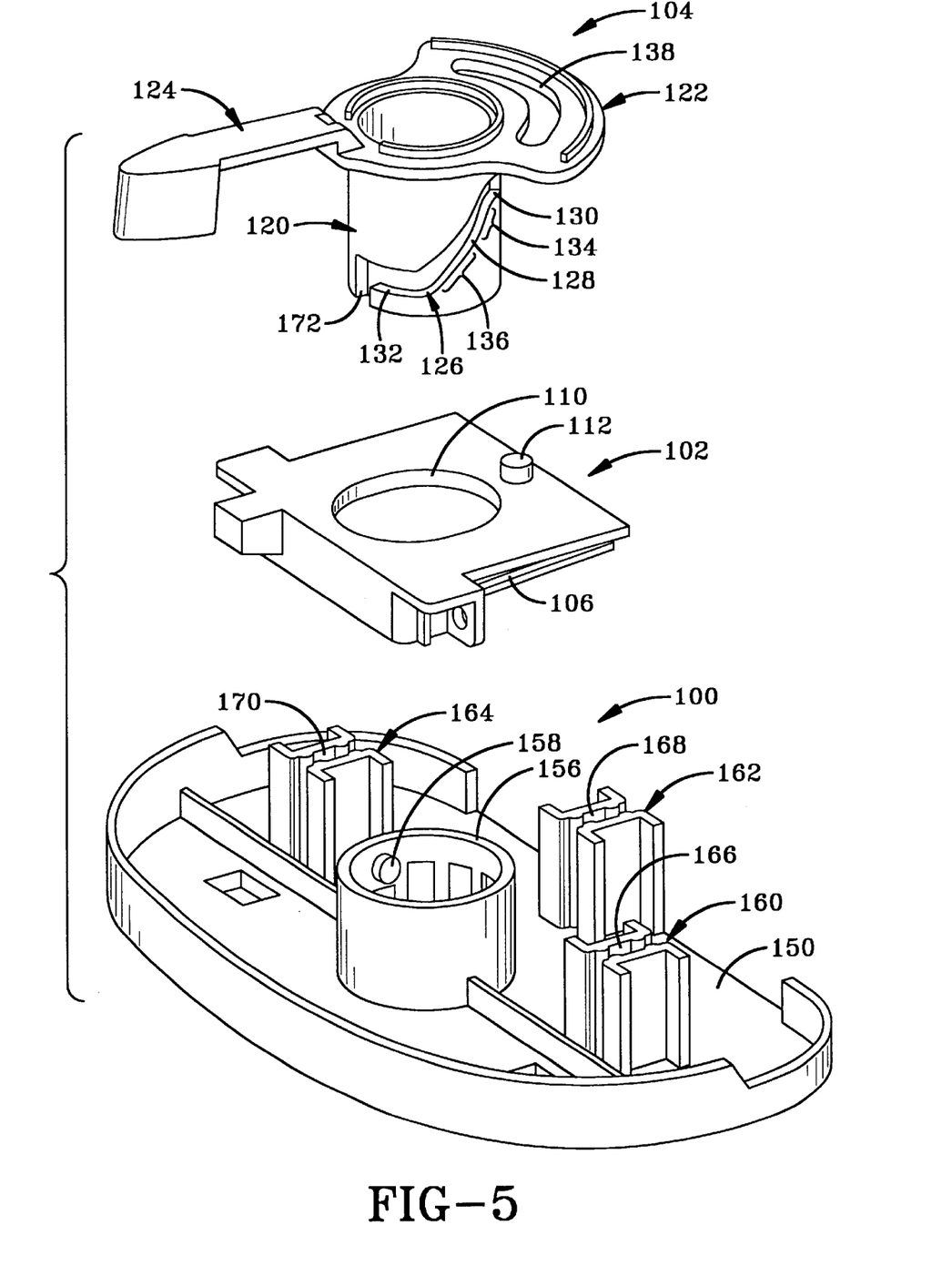
FIG. 5 is an exploded perspective view of the latching mechanism according to one form of the present.

Referring to FIGS. 5–9, the dirt cup assembly is retained in place upon the housing 4 by a latching mechanism mounted within the top handle cover 20 (not shown in FIGS. 5–9). As best shown in FIG. 5, the latching mechanism includes a latch plate 100, a cam sleeve 102, and a latch cam 104. The cam sleeve is securely attached to the housing by sliding channels 106 in the edges of the cam sleeve over the edges of a correspondingly shaped recess formed in a retaining wall 108 (FIG. 6) integrally molded with the housing 4. The cam sleeve includes a through hole 110 and a cam post 112 that extends up from an upper surface of the cam sleeve. The through hole 110 is somewhat elongate from front to back.

Figure 6:
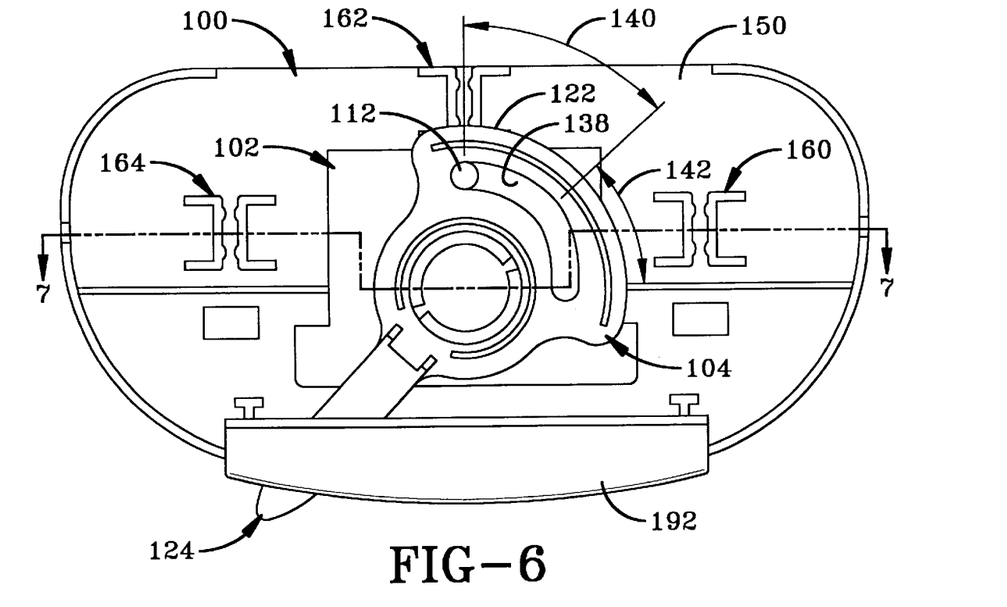
FIG. 6 is a top view of the latching mechanism according to one form of the present invention shown in the unlatched position, the latching mechanism is illustrated in FIG. 5 separate from the rest of the cleaner for clarity.
Figure 8:
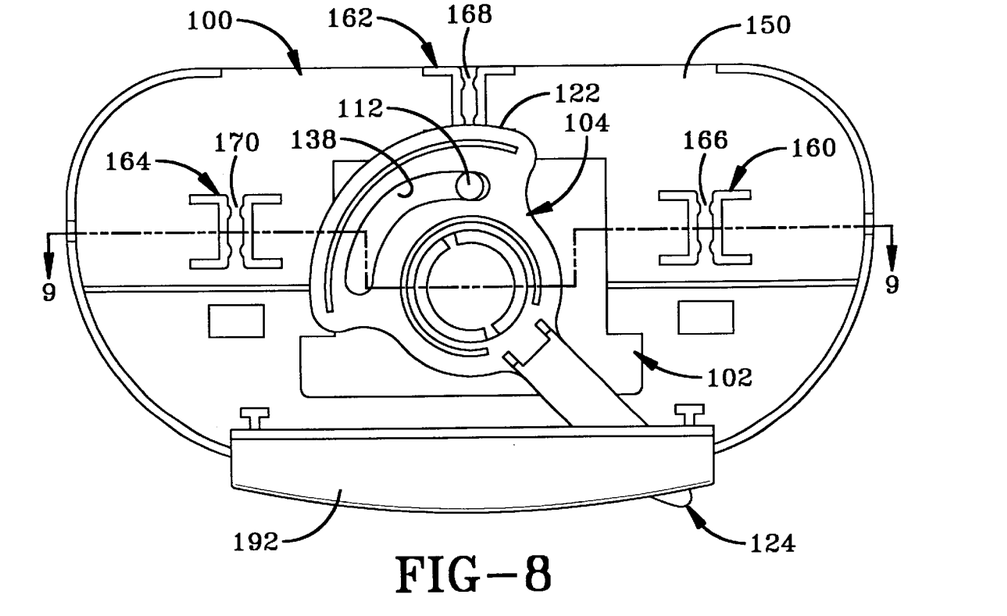
FIG. 8 is a top view of the latching mechanism shown in the latched position, the latching mechanism is illustrated in FIG. 8 separate from the rest of the cleaner for clarity.

The latch cam 104 includes a cylindrical cam portion 120, a planar cam flange portion 122, and an actuation lever 124. A pair of diametrically opposed helical cam grooves 126 are formed in the outer peripheral surface of the cylindrical cam portion. The cam grooves includes a central, substantially helical potion 128 and substantially horizontal lands 130 and 132 at either end. The helical portion of the cam groove may include a first helical portion 134 and second helical portion 136. The first helical portion is formed with a steeper incline than the second helical portion. The cam flange includes a cam slot 138.that has a first cam portion 140 that is concentric to the central axis of the cylindrical cam portion and a second cam portion 142 that is not concentric to the central axis of the cylindrical cam portion. As shown in FIGS. 6 and 8, the second cam portion 142 converges on the central axis of the cylindrical cam portion moving away from the first cam portion.

The latch plate 100 includes a platen 150 having a substantially planar lower surface 152 with a pair of protrusions or bumps 154 extending down therefrom. A cylindrical sleeve 156 extends up from said platen. A pair of diametrically opposed pins 158 extend inward from an inner surface of the sleeve. Three pair of guide flanges 160, 162 and 164 also extend up from,said platen. Each pair of guide flanges is closely spaced from each other defining a guide channel 166, 168, and 170, between each pair.

The latch cam 104 is preferably formed of a material having a low coefficient of friction and good wear resistance properties. For example, acetal, or some other suitable material may be employed to form the latch cam. In order to ensure smooth operation and good wear characteristics of the latch mechanism, the plate 100 is preferably made out of a material that is dissimilar to that of the latch cam. For example, if the latch cam is formed of acetal, then the latch plate may be formed out of polycarbonate, ABS, or some other suitable material, as is well understood by one of skill in the art.

Figure 7:
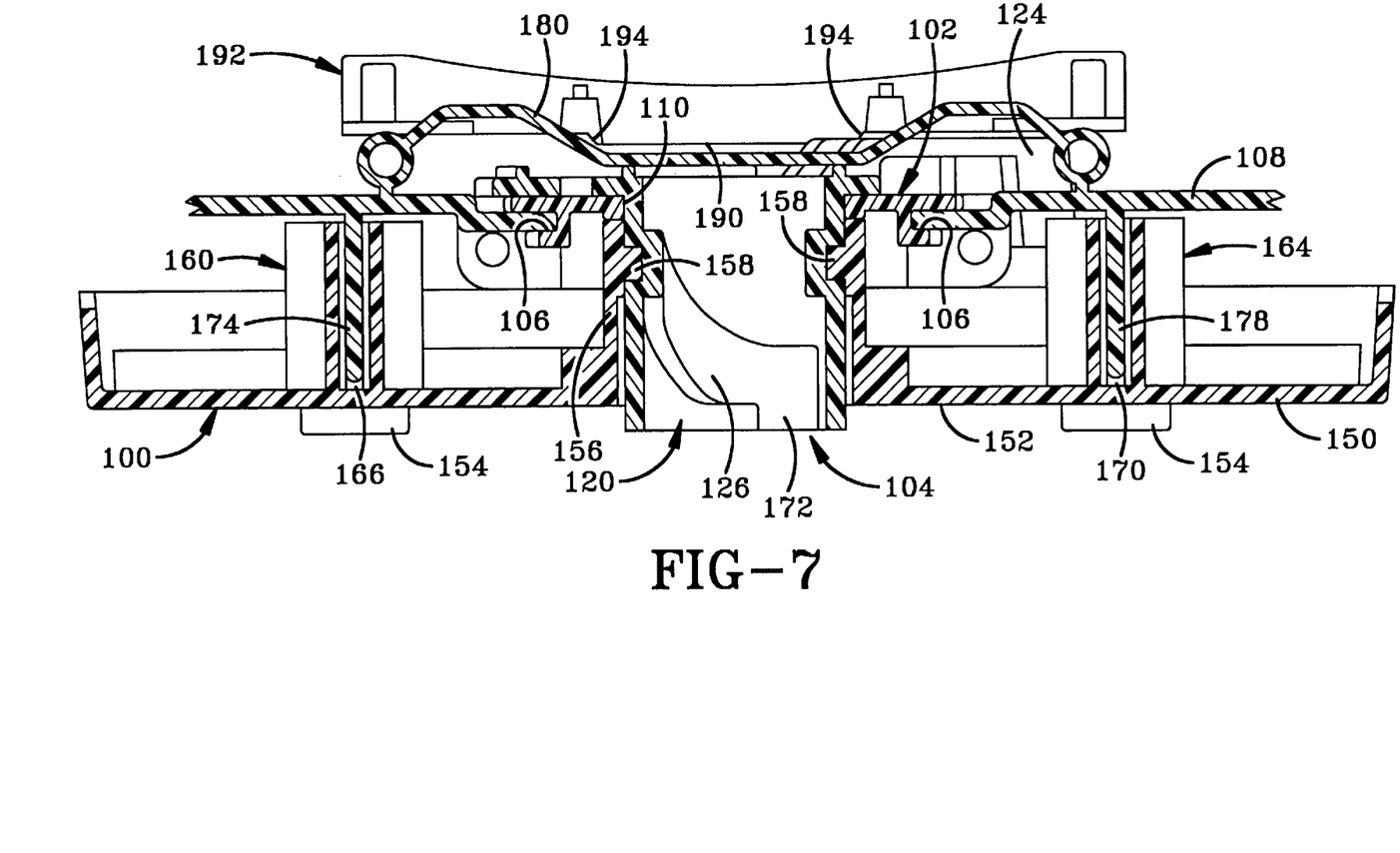
FIG. 7 cross-sectional view taken along line 6—6 in FIG. 5, showing the latching mechanism mounted in the cleaner housing in the unlatched position.
Figure 9:
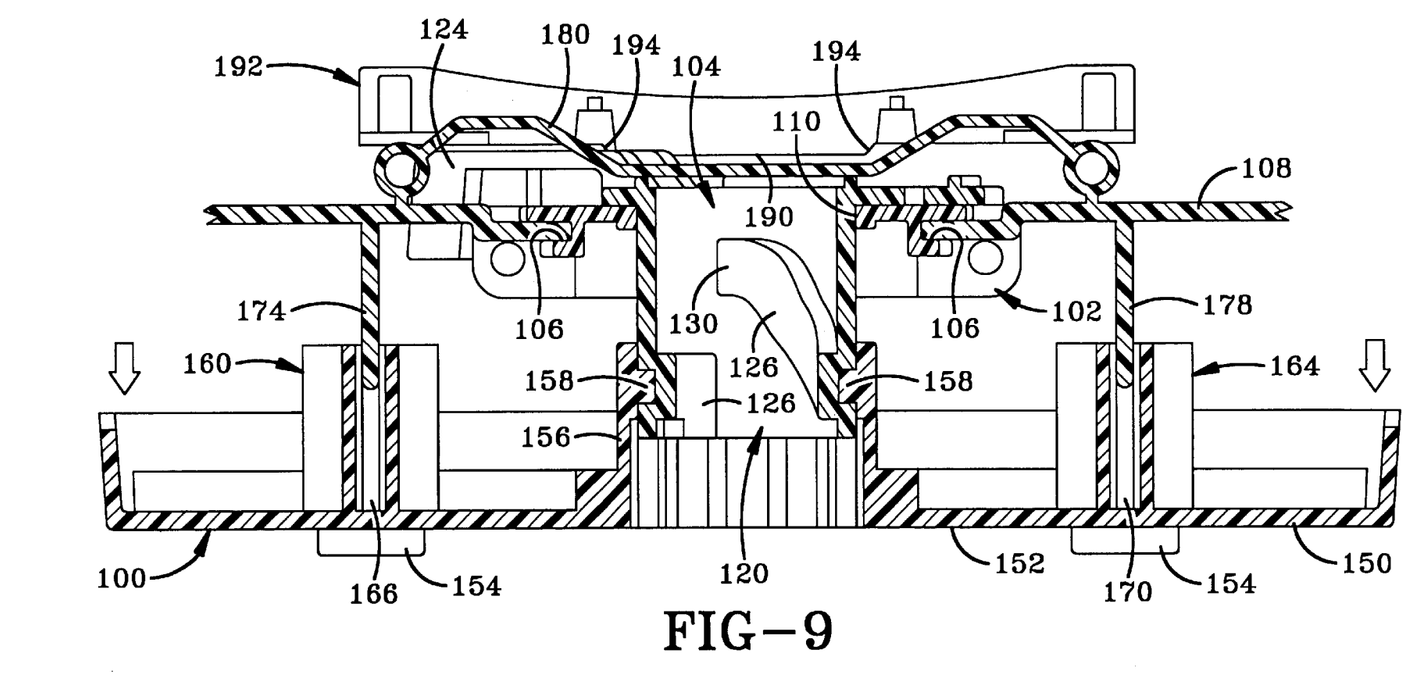
FIG. 9 cross-sectional view taken along line 8—8 in FIG. 7, showing the latching mechanism mounted in the cleaner housing in the latched position.

The latch mechanism is installed by first inserting the cylindrical cam portion 120 of the latch cam 104 through the hole 110 in the cam sleeve 102, until the cam flange 122 rests on the top of the cam sleeve, with the cam post 112 riding in the cam slot 138, and the cylindrical cam portion extending down below the cam sleeve. The cylindrical sleeve 156 on the latch plate 100 is then passed over the lower end of the cylindrical cam portion 120, with the pins 158 in alignment with open lower ends 172 of the can grooves 126. Thus, the pins 158 are inserted into and ride in the cam grooves. The assembly is now mounted to the housing by sliding channels 106 in the side edges of the cam sleeve 102 over edges of a recess in the retaining wall 108, while simultaneously sliding the guide channels 166, 168, and 170 defined by the guide flanges 160, 162 and 164 on the latch plate over guide rails, only two of which 174 and 178 are visible in FIGS. 7 and 9, integrally formed with the housing. The latch cam 104 is now vertically trapped between the latch sleeve 102 and a retaining wall 180 integrally formed with the housing 4, as shown in FIGS. 7 and 9.

The latching mechanism is movable between an unlatched position (FIGS. 6 and 7) and a latched position of (FIGS. 8 and 9), by pivoting the lever 124 from left (FIGS. 6 and 7) to right (FIGS. 8 and 9) and right to left, respectively. When the cam lever is pivoted from left to right, the entire latch cam 104 rotates in the latch sleeve 102. As the latch cam rotates, the pins 158 on the latch plate 100 ride in the helical cam grooves 126, whereby the latch plate is moved downward, and the cam post 112 rides in the cam slot 138. During a first range of motion the cam post rides in the concentric portion 140 of the cam slot, and the latch sleeve 104 rotates about a fixed axis near the front of elongate hole 110 in the latch sleeve. During the final range of motion from unlatched to latched position, the cam post rides in the non-concentric portion 142 of the cam slot. As a result, the latch cam is pulled rearward in the elongate hole 110, whereby latch plate 100 moves rearward relative the housing 4. With this construction, when the latch lever is moved from the unlatched to the latched position, the latch plate is first moved down and then down and back relative to the housing 4. The motion of the latch plate is reversed when the latch lever is moved from the latched to the unlatched position.

In operation, the dirt cup lid 42 is placed on the top of the dirt cup 10. The dirt cup is then held by its handle 56 and inserted horizontally into the front cavity 22 of the vacuum cleaner housing 4. When the dirt cup is fully inserted into the cavity, the dirt cup is lowered to seat the stepped portion 58 of the bottom wall of the dirt cup within the recessed area 34 of the dirt cup housing bottom wall I 18. Once the dirt cup is seated within the housing, the latching mechanism is moved into the latched position by moving the latch lever 124 from left to right. As the latch lever is moved through a first range of motion toward the latched position, the latch cam 104 moves the latch plate down into engagement with the lid 42, such that the bumps 154 on the latch plated are received in the pockets 64 on the lid and the lower surface 152 of the latch plate abuts up against the upper surface 66 of the lid. The first portion 134 of the helical cam grooves 126 is formed relatively steep, so that the latch plate 100 will move quickly down into engagement with the lid during the first range of motion of the lever. During the final range of motion of the latch lever into the latched position, the latch plate moves further down and rearward, as discussed above. Thus, the latch plate presses the lid down on the dirt cup, presses the dirt cup 10 down against the outlet seal 38 and back against the inlet seal 32. The second portion 136 of the helical cam grooves 126 are formed with less of an incline than the first portion, in order to provide a more powerful downward force in the final motion into the latched position for effectively sealing the dirt cup against the exhaust opening 36.

When traveling between the latched and unlatched position, the latch lever 124 is biased down by and travels over a detent ridge 190 integrally formed with a latch cover 192 attached to the housing 4. Upon reaching the latched and unlatched positions, the latch lever snaps over the ends 194 of the detent ridge 190, thereby providing a positive feel to the operation of the latch and positively retaining the lever in the latched and unlatched positions.

The bagless vacuum cleaner 1 is operated as described above with the dirt, dust and debris being filtered from the dirt-laden air stream and collected within the first dirt collecting chamber 80 and the second dirt collecting chamber 82. After a quantity of dirt has accumulated within the first and second dirt collecting chambers, the dirt cup 10 must be removed from the vacuum cleaner 1 for emptying thereof. To remove the dirt cup from the vacuum cleaner housing 4, the user moves the latch lever 124 from right to left into the unlatched position, whereby the latch plate 100 is raised clear of the dirt cup lid 42. The dirt cup 10 is now lifted upwardly and then outwardly by handle 56 for removal from the vacuum cleaner housing and is transported to a waste container. The lid is removed and the contents of the dirt cup are discharged into the waste container by inverting the dirt cup.

Accordingly, an improved dirt cup latching mechanism for a vacuum cleaner that achieves all of the enumerated objectives is provided by the present invention. While there has been shown and described herein several embodiments of the present invention, it should be readily apparent to persons skilled in the art that numerous modifications may be made therein without departing from the true spirit and scope of the invention. For example, it will be appreciated that the detent feature provided by cooperating elements of the latch cover 192 and the latch lever 124 may alternatively be formed by cooperating elements of the latch lever and the latch sleeve 102. Accordingly, it is intended for the appended claims to cover all such modifications that come within the spirit and scope of the invention.

What is claimed is:

1. A dirt cup latching arrangement for a vacuum cleaner comprising:
    a dirt cup housing having a recess formed in a front side thereof, said recess having a rear wall and at least one of a top and a bottom wall;
    a dirt cup for collecting dirt picked up by the vacuum cleaner, said dirt cup being sized to be removably placed in said recess;
    said dirt cup housing including a dirt cup latch for securely latching said dirt cup in place in said recess, said dirt cup latch including a latch member that is mounted to said housing on a side of said recess opposite from said at least one of a top and bottom wall; and
    wherein said latch member is mounted to move generally vertically relative to said housing into engagement with a top of said dirt cup to vertically retain said dirt cup between said at least one of a top and bottom wall and said latch member, and to move generally horizontally relative to said housing to horizontally retain said dirt cup between said rear wall and said latch member.

2. A vacuum cleaner comprising:
    a housing having a recess formed therein, said recess having a bottom wall;
    a dirt collecting cup having a lid, said cup being sized and shaped to be received in said housing and rest on said bottom wall; and
    a dirt cup latch mounted to said housing, said latch being movable from an unlatched position, in which said latch does not engage said cup or said lid, into a latched position, in which said latch engages said lid and presses said lid sealingly in place on said cup and presses said cup, via said lid, against said bottom wall to thereby secure said cup in said recess.

3. A vacuum cleaner according to claim 2, wherein said recess has an inner generally vertical wall, and when said latch is moved from said unlatched into said latched position said latch moves toward said inner wall and presses said cup against said inner wall.

4. The latching arrangement according to claim 1 wherein the latch member includes an actuation lever pivotable along a horizontal plane whereby pivoting of said actuation lever moves the latch member generally vertically and generally horizontally.

5. The latching arrangement according to claim 1 wherein the latch member includes a latch plate and a latch cam operatively connected to said latch plate.

6. The latching arrangement according to claim 5 wherein the latch member is formed with a helical cam groove which is engaged by a pin of said latch plate whereby rotation of said latch member provides for generally vertical movement of said latch plate.

7. A latching arrangement movable between a latched position for retaining a dirt cup to a housing of a vacuum cleaner and an unlatched position for allowing the removal of said dirt cup from the housing of the vacuum cleaner, said latching arrangement including:
    a latch cam having an actuation lever for rotating said latch cam about a generally vertical axis;
    a latch plate operatively connected to said latch cam;
    a cam sleeve mounted on the housing and positioned between said latch cam and said latch plate; and
    whereby horizontal translation of the actuation lever of said latch cam imparts a vertical motion on said latch plate.

8. The latching arrangement according to claim 7 wherein:
    the latch cam is formed with a helical cam groove;
    the latch plate is formed with a pin which is received within the helical cam groove of the latch cam; and
    wherein said pin rides within said helical groove when the latch cam is rotated to move the latch plate vertically.

9. The latching arrangement according to claim 7 wherein:
    the latch cam includes a planar surface which is formed with a cam slot;
    the cam sleeve includes a cam post which is received within said cam slot; and
    whereby said cam post rides within said cam slot when the latch cam is rotated to impart a horizontal motion on said latch plate.

10. The latching arrangement according to claim 9 wherein a portion of the cam slot is curved to converge on the generally vertical axis, said curved converging portion of the cam slot causes inward horizontal movement of the latch plate.

11. The latching arrangement according to claim 7 wherein the latch plate applies a vertical force on the dirt cup when the latching arrangement is moved to the latched position.

12. The latching arrangement according to claim 11 wherein said dirt cup includes a lid and wherein said latch plate applies the vertical force on said lid of the dirt cup.

13. The latching arrangement according to claim 7 wherein one of the housing and latch plate is formed with a guide channel and the other of the housing and latch plate is formed with a guide rail which is received within the guide channel for guiding the latch plate as the latch plate moves vertically.

14. A vacuum cleaner including:
    a housing having a rear wall, an end wall and being formed with a recess;

a dirt cup removably mounted within the recess of said housing; and a latching arrangement positioned on the housing opposite the end wall for removably retaining said dirt cup within the recess, said latching arrangement having a latch plate movable along a generally vertical axis for applying a vertical force on said dirt cup to vertically retain said dirt cup on said housing, and movable along a horizontal axis for applying a horizontal force on said dirt cup to horizontally retain said dirt cup on said housing.

15. The vacuum cleaner according to claim 14 wherein said dirt cup includes a lid and wherein said latch plate applies the vertical force and the horizontal force on said lid.

16. The vacuum cleaner according to claim 15 wherein a bump extends outwardly from the latch plate and the lid is formed with a pocket, said bump engaging the pocket to align and horizontally retain the dirt cup on the housing.

17. The vacuum cleaner according to claim 14 wherein:
the rear wall of the housing is formed with an outlet opening;
the dirt cup is formed with an inlet opening which is in fluid communication with said outlet opening;
a seal is positioned between about a periphery of one of the inlet and outlet openings whereby the horizontal force applied by the latch plate sandwiches said seal between the rear wall of the housing and the dirt cup to seal the fluid communication between the inlet and outlet openings.

18. A floor cleaning appliance, comprising:
a dirt-collecting chamber;
a lid partially defining the dirt-collecting chamber;
a housing having an opening for receiving the dirt collecting chamber and the lid; and
a pivoting latch on the housing having an open position and a closed position,
wherein said pivoting latch holds said dirt collecting chamber in said opening of said housing when in the closed position and allowing said dirt collecting chamber to be removed from said opening of said housing when said latch is in the open position.

19. The floor-cleaning appliance of claim 18 wherein said opening has a generally vertical inner wall, and when said pivoting latch is moved from said open position to said closed position said pivoting latch moves toward said inner wall and presses said dirt collecting chamber against said inner wall.

20. The floor-cleaning appliance of claim 18 wherein said pivoting latch includes an actuation lever pivotable along a horizontal plane whereby pivoting of said actuation lever moves the pivoting latch generally vertically and generally horizontally.

21. The floor-cleaning appliance according to claim 18 wherein said pivoting latch includes a latch plate and a latch cam operatively connected to said latch plate.

22. The floor-cleaning appliance according to claim 21 wherein said latch member is formed with a helical cam groove which is engaged by a pin of said latch plate whereby rotation of said latch member provides for generally vertical movement of said latch plate.

23. A vacuum cleaner comprising:
a dirt cup having
(i) at least one sidewall extending from an end wall forming a dirt collecting chamber having an open end; and
(ii) a lid for sealing the open end of the dirt collecting chamber;
a housing having a recess for receiving the dirt cup; and
a latch operatively connected to the housing having a first position and a second position, wherein:
said latch secures said dirt cup in said recess of said housing when in the first position by applying a bearing force against said lid of said dirt cup, and the latch allows the dirt cup to be removed from the recess when the latch is in the second position.

24. A dirt collecting system for a vacuum cleaner, comprising:
a dirt cup;
a lid for the dirt cup; and
an enclosure formed in a housing of the vacuum cleaner for receiving said dirt cup;
a securing assembly attached to the housing for selectively securing said dirt cup in said enclosure, said securing assembly comprised of:
(i) a bearing member; and
(ii) a lever for urging the bearing member against the lid of the dirt cup to apply pressure to the lid of the dirt cup to hold said dirt cup in said enclosure.

* * * * *